UNITED STATES PATENT OFFICE.

THOMAS W. McFARLAND, OF CHICAGO, ILLINOIS.

RECOVERING THE FIBER OF THE COTTON-PLANT.

No. 858,411.     Specification of Letters Patent.     Patented July 2, 1907.

Application filed March 19, 1904. Serial No. 198,980.

*To all whom it may concern:*

Be it known that I, THOMAS W. MCFARLAND, a citizen of the United States, residing at Chicago, in the county of Cook and State of Illinois, have invented a new and useful Process for Recovering the Fiber of the Cotton-Plant, of which the following is a full, clear, and exact specification.

My invention relates to recovery of the fibers in the hard body and root portions of the cotton plant, the softer bark, the tender upper last growth portions, the ripe, and also the unripe boll, and the delicate cotton fibers therein.

The cotton plant is rich in useful fiber from root to leaf, and although of annular growth there is a continuous sprouting of buds or pods from the time of the first blossoms to the close of the season, when the plant is ordinarily abandoned, thus at all times during the season presenting a crop of pods or bolls in various stages of development, and, necessarily, resulting in many being abandoned with the plant at the season's close, the ripe ones of these being too scattering to warrant picking, and those which are not ripe, or which have not yet burst open, although containing valuable cotton fiber, are useless for ordinary purposes. The bark of the plant contains a large percentage of long fiber which, if harvested before the plant deteriorates from atmospheric exposure and is properly recovered, is well adapted for spinning purposes, and weaving into coarse fabric, such as bagging and baling; and in the woody portion of the plant is a fiber suitable for paper making. It, of course, goes without saying that the cotton in the pods remaining on the plant at the close of the season is also suitable for all of these purposes, and for many others.

It is the object of my invention to recover these several and distinct products by simultaneously treating them in such a manner and by such means as will cause their disintegration and separation without injury to any of them, and particularly the ripe and unripe cotton fibers of the cotton plant.

I take the entire plant and cut it into short lengths, and then passing these through any suitable crushing rolls to reduce the stalk and roots to a fine or uniform consistency, so that a uniform reduction by the digesting operation or process may be obtained. This crushing operation also bursts open the pods that may exist on the plant and renders the cotton therein accessible, as well as breaking up the hulls or outer shells of the pods, so that they may be readily separated from the raw cotton or fiber, and it also reduces the woody portion of the stalk and root to a condition which is substantially uniform with the consistency or condition of the pods, and prepares the entire mass for the digesting operation, making it possible to separate the fibers of the harder or woody portions by means of a digesting solution of a strength not great enough to destroy the finer fibers of the pods and bark. After this has been done, the entire mass is placed in any suitable digester and first treated with water alone, the water and the material being placed in the digester together, so as to insure an intimate commingling of the two, and thorough saturation of the cotton and the woody particles of the plant, when heat is applied to the digester in any suitable way well known in the art, until a steam pressure of from sixty to one hundred pounds is obtained, and is held at this pressure for from two to four hours. This treatment with water alone under pressure dissolves the gums of the plant to a very large extent, and also draws out the acid which exists, as well as greatly softening the stalks and bolls and fitting the same for the treatment with the cooking liquor, which is to follow. At the conclusion of this treatment with the water, the liquid is blown or drawn off with the acid and the soluble gums that may have been dissolved out during such treatment, or the solid particles and the liquid are separated from each other in any suitable way. The charge is now ready to be digested in a suitable cooking liquor for completing the separation of the fiber from the gums and lignin and other useless constituents of the plant. This cooking liquor is composed preferably of caustic soda and a small quantity of oil, preferably cotton seed oil, which makes a saponified solution. The oil can be advantageously obtained by adding a small percentage of cotton seed to the charge, such seeds having been crushed before they are introduced.

By first treating the charge with water under pressure, as above described, I am able to make a cooking liquor of sufficient strength to complete the work, with only three or four degrees Baumé caustic under pressure of from sixty to one hundred pounds for a duration of five or six hours' time. At the conclusion of this treatment the charge is removed from the digester in the usual, or any suitable way, it being separated from the liquor and then washed and treated in the ordinary way followed for making the paper stock at the conclusion of the digesting operations heretofore employed in this art. By thus treating the charge with water and thereby removing the acid of the plant and a large percentage of the gums and lignin before the caustic cooking liquor is employed, it will be seen that substantially the entire fibrous constituent of the plant is rendered accessible to the caustic cooking liquor almost immediately upon being subjected thereto and, consequently, the cooking liquor does not have an opportunity to entirely dissolve and destroy the free and finer fibers before reaching those which in nature are inclosed in gums and lignin and, as a consequence, I am enabled to obtain the fiber of the woody portions of the plant with a much weaker solution of cooking liquor than would otherwise be possible, and with a solution which is not sufficiently strong to attack and destroy the free and finer fibers of the bark and pods; whereas, if it should be attempted to obtain the entire fiber of the entire plant without this preliminary treatment in water to remove the acid, it would be necessary to employ a cooking liquor of such great strength in order to reach the inner fibers of the woody portion, that the free fibers of the bark and the pods would be entirely dissolved or destroyed and, in any event, rendered so weak as to be useless, before the gums and lignin of the woody portions could be dissolved. The treatment under pressure and heat, however, when water alone is used, does not materially affect the cotton or the free fiber of the bark. Incidental to these advantages, is the further advantage that with the acid of the plant removed before it is introduced into the caustic cooking liquor, a much smaller percentage of the cooking liquor is neutralized than is the case when the plant is subjected to the cooking liquor in the first instance. This same operation or method may be followed if the entire plant is to be treated, minus the bolls or pods, the same being first removed from the plant in any suitable way.

If the upper part of the bush or plant, minus the butts and roots, but including the pods or bolls, is to be treated, the same is preferably cut off at the proper height above the ground while standing in the field, and this upper part of the bush is then cut or broken into convenient lengths suitable for handling in the digester, the same being first run through rollers to crush the woody portions and break open the pods or bolls, if desired, or placed directly in the digester without this preliminary crushing and treated with water under pressure and heat, as before described, but these upper portions of the plant, containing less gum and lignin than the roots and buds, may be treated sufficiently to reduce them in less time and under less pressure and temperature, the same varying somewhat, of course, according to the character of each charge. After the charge has been treated with water as described, it is removed and treated with the caustic cooking liquor in the manner before explained, and is then washed in any suitable tank or trough and the cotton of the pods separated from the fiber of the plant or woody portions. To accomplish this separation, I employ a trough or tank of suitable length and depth, containing in the bottom a screw or conveyer with suitable means for driving. At one end of the tank is a discharge outlet with means for regulating the flow or discharge, and the tank is so constructed that the fiber of the stalks or woody part of the plant will settle to the conveyer in the center of the tank and will be carried out with the wash water, a supply of fresh wash water continually entering at the opposite end of the tank. The cotton or fiber from the pods being lighter than that recovered from the woody portions, will float, and the same is caught on a carrier that lifts and drains it and finally discharges it out of the tank.

To better separate and loosen two different fibers, the tank is provided with revolving stirring reels, or spider-like agitators which agitate the stock in the tank and move the same towards the clear water, permitting the lighter cotton to settle on to the carrier or to be caught by the carrier as the latter rises out of the water. The fiber from the stalks, bark and bolls or pods, having been separated from the cotton by this operation, they settle to the bottom and pass out with the wash water, as before described, whence they may be caught and drained, and are then ready to be beaten up by a suitable beating engine, or otherwise reduced for paper making, the cotton which floats off and is removed by the said carrier being utilized for the usual or any suitable purposes.

If the bolls alone containing such cotton as may be therein at the close of the season are being treated without the balance of the plant, they may be picked from the plant in the field in the usual or any suitable way, those only, however, which show signs of bursting being selected, but which would be unsuitable and not sufficiently developed to warrant picking if the cotton is to be recovered therefrom by the usual method. These bolls or pods with such twigs or branches as are likely to be pulled off therewith in picking, are passed between crushing rolls for the purpose of cracking open the bolls or pods, but are not subjected to such severe pressure as to break the pods or bolls up into small particles. The mass is then subjected to treatment in pure water, as before described, and after that is treated with the caustic soda cooking liquor before described, of two to three degrees Baumé under a steam pressure of from fifty to eighty pounds, according to the time it is desired to do the work in. It is understood, however, that in all cases the liquor is heated and circulated in the digester without being subjected to raw steam, or to steam from outside sources which would weaken the cooking liquor. Hence, in every instance, the digester is heated by a steam coil, or other suitable means. After the charge has been thus treated, the cotton is separated from the hulls and the fiber of the hulls by the method and apparatus before described, the hulls and fiber thereof sinking to the bottom, while the cotton floats off on top. This washing of the cotton forms it into an elongated, stringy condition with the fibers matted together and some of the particles of the pods or bolls will be found adhering thereto, but by the aid of any suitable picker the cotton is separated and these particles are sifted out, thus giving a merchantable article of a length and strength adapting it to be worked into many of the products for which cotton is used. It is also found that this treatment results in staining the product or fiber and this makes it desirable to subject the product to some suitable bleaching operation to remove the stain.

Having thus described my invention, what I claim as new therein and desire to secure by Letters Patent, is:—

1. The herein described method of recovering the fiber of the cotton plant, which consists in first crushing the same, then subjecting the mass to hot water until the gums and acids are removed from the finer and tender fibers thereof and the coarser and tough fibers are softened, then discharging therefrom the water together with the gums and acids dissolved and suspended therein, then dissolving the gums and lignine from the coarser and tough portions of the plant by subjecting the mass to an alkaline solution of a strength incapable of destroying the finer fibers of the plant.

2. The herein described method of recovering the fiber of the cotton plant which consists in first crushing the same, then subjecting the mass to hot water under pressure until the gums and acids are removed from the finer and tender fibers thereof, then discharging therefrom the water together with the gums and acids dissolved and suspended therein, then dissolving the gum and lignine from the coarser and tough portions of the plant by subjecting the mass to an alkaline solution, under pressure, and of a strength incapable of destroying the finer and tender fibers of the plant.

3. The herein described method of recovering the fiber of the cotton plant which consists in first crushing the same, then subjecting the mass to hot water under pressure, until the gums and acids are removed from the finer and tender fibers thereof, and the coarser and tough fibers are softened, then discharging therefrom the water together with the gums and acids contained therein, then dissolving the gum and lignine from the coarser and tough portions of the plant by subjecting the mass to an alkaline solution, of a strength incapable of destroying the finer and tender fibers of the plant, then subjecting the mass to the action of water until the finer fibers are flooded and the tougher fibers have sunk and finally separating the finer from the tougher fibers.

4. The herein described method of recovering a spinning fiber from the unblown bolls of a cotton plant, which consists first in crushing said bolls, then subjecting the mass to the action of hot water under pressure until the fibers of the boll are softened and some of the gums removed therefrom, then discharging the water together with said gums therefrom, then subjecting the mass to the action of an alkali of a strength not destructive of unblown cotton fibers, then removing the mass from the alkaline solution, subjecting it to the action of water until the cotton fibers have floated thereon and the fibers of the boll have sunk therein and finally skimming off the cotton fiber for subsequent spinning.

5. The herein described method of recovering the fiber of the cotton plant, which consists in dissolving the gums or lignine of the woody portion for releasing the fiber and the cotton of the pods or bolls, and finally separating the cotton from the heavier fiber by floating the cotton and allowing the fiber to sink.

6. The herein described method of recovering the fiber of the cotton plant, which consists in subjecting the same to the action of an alkaline cooking liquor and cotton seed oil until the gums and lignine of the plant are dissolved.

THOMAS W. McFARLAND.

Witnesses:
F. A. HOPKINS,
M. B. ALLSTADT.